(12) United States Patent
Varnamkhasti

(10) Patent No.: US 11,115,076 B1
(45) Date of Patent: Sep. 7, 2021

(54) TRANSCEIVER ASSEMBLY PROTECTION ELEMENT

(71) Applicant: Microsoft Technology Licensing, LLC, Redmond, WA (US)

(72) Inventor: Siamak Varnamkhasti, Los Gatos, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/082,672

(22) Filed: Oct. 28, 2020

(51) Int. Cl.
| | |
|---|---|
| H04B 1/10 | (2006.01) |
| H04B 1/04 | (2006.01) |
| H03F 3/24 | (2006.01) |
| H04B 1/44 | (2006.01) |

(52) U.S. Cl.
CPC ............ *H04B 1/44* (2013.01); *H04B 1/0475* (2013.01); *H04B 1/1018* (2013.01); *H04B 2001/0408* (2013.01)

(58) Field of Classification Search
None
See application file for complete search history.

(56) References Cited

U.S. PATENT DOCUMENTS

| | | | | |
|---|---|---|---|---|
| 7,171,572 B2* | 1/2007 | Yamaji | ...................... | G06F 1/32 713/320 |
| 7,977,919 B1* | 7/2011 | Jaoude | ...................... | H04B 1/06 320/136 |
| 8,417,286 B2* | 4/2013 | Gorbachov | .......... | H04B 1/0064 455/553.1 |
| 9,261,543 B2* | 2/2016 | Mimino | ................... | G01R 21/10 |
| 10,608,598 B2* | 3/2020 | Wang | ......................... | H01P 5/18 |
| 2009/0137217 A1* | 5/2009 | Huang | ....................... | H03F 3/24 455/126 |
| 2012/0264378 A1* | 10/2012 | Steele | ................... | H03G 3/3042 455/73 |

* cited by examiner

*Primary Examiner* — Pablo N Tran
(74) *Attorney, Agent, or Firm* — Alleman Hall Creasman & Tuttle LLP

(57) ABSTRACT

A transceiver assembly includes a radio frequency (RF) transceiver configured to transmit and receive signals, and a transceiver controller operatively coupled with the transceiver via a transmit path and a receive path. A power amplifier disposed along the transmit path is configured to amplify RF signals for transmission by the transceiver. A power detection line is configured to provide power control feedback to the transceiver controller indicating an amplitude of current flowing from the power amplifier to the transceiver. A directionally-specific protection element disposed along the power detection line is configured to allow the power control feedback to flow to the transceiver controller over the power detection line in a first direction, while preventing at least some electrical noise originating from the transceiver controller from flowing through the power detection line in a second direction, thereby preventing the electrical noise from entering the receive path.

20 Claims, 3 Drawing Sheets

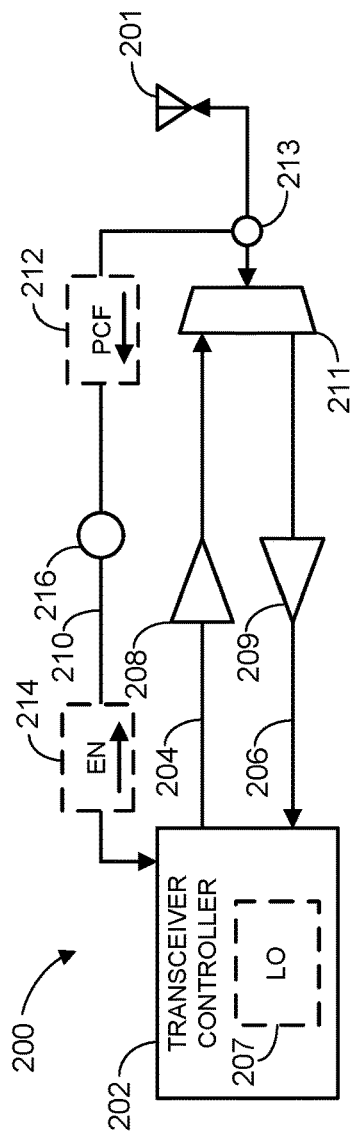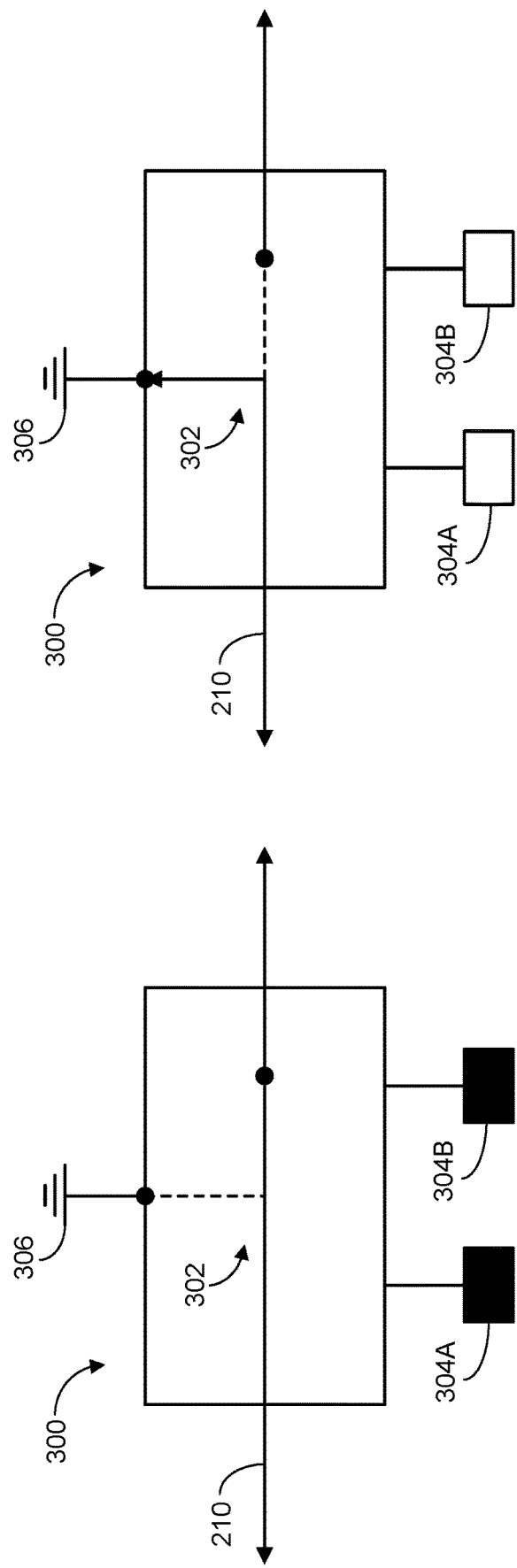

TRANSCEIVER ASSEMBLY PROTECTION ELEMENT

BACKGROUND

Transceivers are electrical components that enable both transmission and reception of radio frequency (RF) signals. Transceivers may be used to enable wireless communication between electronic devices.

BRIEF DESCRIPTION OF THE DRAWINGS

FIG. 2 schematically depicts an example transceiver assembly.

FIGS. 3A and 3B schematically depict an example directionally-specific protection element.

DETAILED DESCRIPTION

Figure 1:
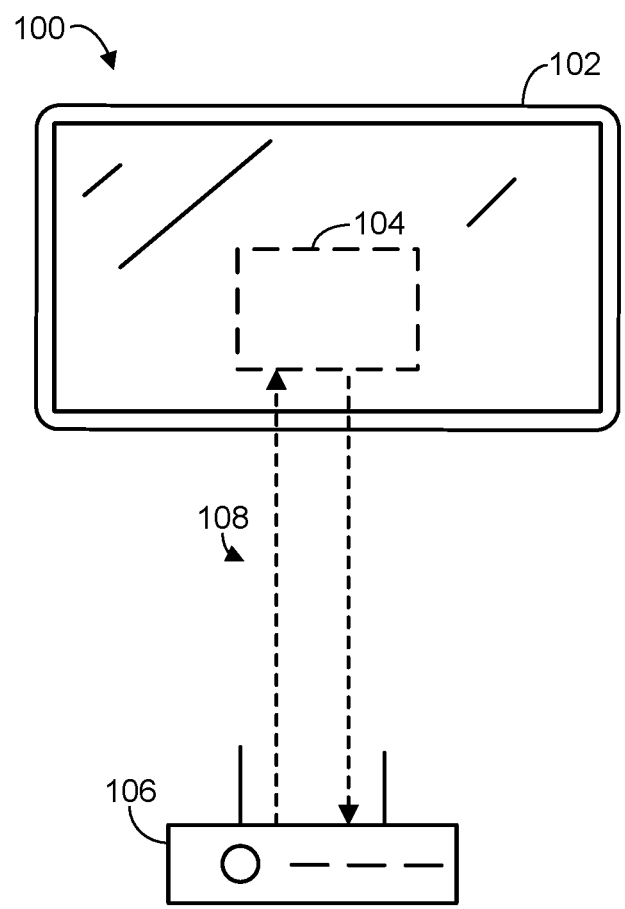
FIG. 1 schematically depicts wireless communication between electronic devices via a transceiver.

As discussed above, electronic devices commonly include radio frequency (RF) transceivers enabling wireless communication with other electronic devices, via exchange of RF signals. This is schematically illustrated in FIG. 1, which depicts an example electronic device 100. The electronic device includes a physical housing 102, and disposed within the housing, a transceiver assembly 104. The transceiver assembly is configured to enable wireless communications between electronic device 100 and another electronic device 106, via RF signals 108 exchanged between the two electronic devices.

The specific devices illustrated in FIG. 1 are non-limiting examples. As shown, electronic device 100 takes the form of a mobile computing device including a display—e.g., a smartphone or tablet computer—while electronic device 106 is a network router. In other examples, however, the transceiver assembly described herein may be implemented with any suitable electronic devices having any suitable sizes, shapes, form factors, and hardware configurations. For example, an "electronic device" may include computing devices such as laptops, desktops, servers, smartphones, tablets, wearable computing devices (e.g., smart watches, head-mounted displays), automotive devices, media centers, video game devices (e.g., consoles, controllers, peripherals), network infrastructure (e.g., Wi-Fi routers), smart appliances (e.g., refrigerators, dishwashers, laundry machines), building infrastructure (e.g., HVAC systems, elevators), toys, medical devices, environmental monitors (e.g., thermometers, humidity monitors, pH meters), security devices (e.g., cameras, motion sensors), and/or any other suitable electronic devices that may benefit from wireless communication capabilities. In some examples, an "electronic device" may be implemented as computing system 500 described below with respect to FIG. 5.

The transceiver assemblies described herein are generally described as enabling wireless communication via exchange of "RF signals." For the purposes of this disclosure, RF signals include electromagnetic radiation with a frequency ranging between 30 Hz and 300 GHz, although the present disclosure covers any suitable types of wireless signals, which may include signals having frequencies outside this frequency range. Such RF signals will typically convey some type of information, referred to as a modulation signal, from one device to another as part of a carrier wave. The modulation signal may include, as examples, digital computer information, an encoded audio signal, and/or an encoded video signal. For example, digital computer information is often exchanged via RF signals having frequencies in the 2.4 GHz or 5 GHz frequency bands, via 4G, 5G, and/or Wi-Fi technology. However, the transceiver assemblies described herein may be configured to send and receive any suitable RF signals having any suitable frequencies and carrying any suitable information. It will be understood that the present disclosure is not limited to any specific communication protocols or types of RF signals.

FIG. 2 schematically illustrates an example transceiver assembly 200, including an RF transceiver 201 configured to transmit and receive RF signals. Any suitable type of transceiver may be used. Transceiver assembly 200 also includes a transceiver controller 202 operatively coupled with the transceiver via a transmit path 204 and a receive path 206. In general, the transceiver controller functions to output RF signals for transmission by RF transceiver 201, as well as receive and process RF signals received by the RF transceiver. For example, the transceiver controller may receive a modulation signal from another source, generate a carrier wave by oscillating an electrical current via a local oscillator 207, and modulate the carrier wave based on the modulation signal. A power amplifier 208 disposed along the transmit path between the transceiver controller and receiver is configured to amplify RF signals received from the controller, for transmission by the transceiver. Similarly, RF signals received by the transceiver controller may be bandpass filtered, then demodulated, to extract the original modulation signal. In the example of FIG. 2, transceiver assembly 200 further comprises a low-noise amplifier 209 disposed along the receive path between the transceiver and transceiver controller, configured to amplify RF signals received from the transceiver for processing by the transceiver controller.

The transceiver controller, local oscillator, power amplifier, and low-noise amplifier may each take any suitable form. The transceiver controller may take the form of any suitable logical element useable to generate RF signals for, and receive RF signals from, an RF transceiver. As non-limiting examples, the transceiver controller may be implemented as an integrated circuit, system on a chip, or computer processor. In some examples, the transceiver controller may be implemented as logic subsystem 502 described below with respect to FIG. 5. The specific capabilities of the power amplifier and low-noise amplifier may vary from implementation to implementation depending on the specific nature of the RF signals transmitted and received by the transceiver. Any suitable amplifiers may be used.

FIG. 2 also depicts a power detection line 210 that enables the transceiver controller to monitor electrical conditions in the vicinity of the transceiver. Notably, in FIG. 2, the transmit and receive paths intersect at a multiplexer 211, such that electrical signals coming from power amplifier 208 are passed along to RF transceiver 201, while electrical signals coming from RF transceiver 201 enter the receive path. The power detection line monitors electrical conditions at a monitoring node 213 between the multiplexer and RF transceiver. Specifically, the power detection line is configured to provide power control feedback 212 to the transceiver controller indicating the electrical conditions at monitoring node 213. Pertinent information will often include the amplitude of current flowing from the power amplifier to the transceiver.

For example, many jurisdictions have regulations mandating accurate power control mechanisms via closed loop power control (CLPC) or open loop power control (OLOC) in wireless devices. Thus, the transceiver controller may use the power detection line to monitor the amount of current flowing from the power amplifier to the RF transceiver. This value may be compared to the amount of current that is supposed to be sent to the transceiver, based on the device's programming, a control signal received from a base station, and/or applicable regulations. The transceiver controller may then be configured to change an amplitude of the RF signal sent to the power amplifier for transmission by the transceiver based on the power control feedback. For example, the amplitude may be increased to improve the signal-to-noise ratio at the receiving device, or the amplitude may be reduced to mitigate co-channel interference. It will be understood that the power control feedback may take any suitable form, provided that it serves as an indication of the amount of power flowing from the power amplifier to the RF transceiver, and the transceiver controller may respond to such feedback in any suitable way and for any suitable reason.

Use of a power detection line in this manner can inadvertently introduce spurious signals into the receive path, from which they may be coupled in the low-noise amplifier and cause receiver performance degradation. In other words, while enabling power control feedback to flow to the transceiver controller, the power detection line can also interfere with transceiver performance when spurious signals flow in the opposite direction of the power control feedback. Such spurious signals may have any suitable origin, though will often come from the transceiver controller. For example, in the example of FIG. 2, electrical noise 214 generated by local oscillator 207 in transceiver controller 202 may leak into receive path 206. Once received by the transceiver controller, this electrical noise may be mixed with the primary local oscillator signal in the transceiver controller's signal mixer. Such self-mixing may lead to direct current (DC) offset accumulation, eventually causing a permanent degradation in receiver sensitivity and throughput. Other types of electrical noise may, when amplified by the low-noise amplifier, overpower the desired signal received by the RF transceiver, reducing transceiver performance even if no permanent damage is caused. Though the present disclosure primarily focuses on electrical noise originating from the local oscillator, it will be understood that "electrical noise" can refer to any electrical signals other than an intended signal to be transmitted or received by the transceiver. Such electrical noise may originate from the transceiver controller in many cases, though the transceiver assembly described herein may serve to mitigate electrical noise coming from additional or alternative sources.

Accordingly, the present disclosure is directed to a directionally-specific protection element configured to allow the power control feedback to flow to the transceiver controller, while preventing at least some electrical noise originating in the transceiver controller from entering the receive path. In this manner, as discussed above, the directionally-specific protection element may prevent performance degradation and damage of the transceiver assembly by preventing at least some electrical noise from entering the transceiver controller. At the same time, however, the power control feedback may still pass to the transceiver controller, enabling the transceiver controller to increase or decrease the current amplitude as needed. FIG. 2 schematically depicts an example directionally-specific protection element 216, disposed along power detection line 210. The protection element allows power control feedback 212 to flow to transceiver controller 202 in a first direction, given by the arrow included in the "PCF" box. By contrast, electrical noise 214 flowing in a second direction away from the transceiver controller (opposite the first direction) may be at least partially blocked from passing through the protection element and entering receive path 206.

The "directionally-specific" nature of the protection element arises from the fact that electrical current flowing along the power detection line in one direction (e.g., the first direction toward the controller) is treated differently from electrical current flowing in the other direction (e.g., the second direction away from the controller). For example, the directionally-specific protection element may provide a higher electrical impedance in one direction (e.g., the second direction) than the other direction (e.g., the first direction). This has the effect of reducing the amount of electrical noise originating from the transceiver controller that enters the receive path.

Such a directionally-specific protection element may be implemented in various suitable ways. In some cases, the directionally-specific protection element may include a switch configured to close during transmission of RF signals by the transceiver, and configured to open during receiving of RF signals at the transceiver. In this manner, the directionally-specific protection element may allow the power control feedback to flow to the transceiver controller during transmission of RF signals by the transceiver. However, during receiving of RF signals by the transceiver, the protection element may be configured to redirect electrical noise originating from the transceiver controller away from the receive path and toward ground.

This is schematically illustrated with respect to FIGS. 3A and 3B, each depicting an example switch 300 that may be included as part of directionally-specific protection element 216. In this example, the switch includes an OR gate configured to open or close depending on an active status of one or more control inputs to the OR gate. Switch 300 includes two control inputs 304A and 304B. For example, each control input to the OR gate may indicate a transmission status of a different frequency band of RF signals by the transceiver. Thus, in FIGS. 3A and 3B, the two different control inputs correspond to two different frequency bands—e.g., a 2.4 GHz frequency band and a 5 GHz frequency band. In the event that any of the two control inputs are active, indicating transmission of RF signals by the receiver, the OR gate will close to allow power control feedback to flow to the transceiver controller over power detection line 210.

This is schematically illustrated in FIG. 3A, in which both of control inputs 304A and 304B are filled in black to indicate that they are active. As such, switch 300 is closed. By contrast, in FIG. 3B, both of control inputs 304A and 304B are inactive, indicating that no RF signals are being transmitted by the transceiver. As such, switch 300 is open, causing any electrical noise originating from the transceiver controller to be redirected to ground 306. Inputs 304A and 304B may be activated or deactivated in any suitable way. In many cases, the control inputs may be operatively coupled with the transceiver controller, or other logical element, that is configured to output a signal whenever the transceiver is transmitting.

It will be understood that the switch depicted in FIGS. 3A and 3B is deliberately simplified for visual clarity, and is presented as a non-limiting example. In other implementations, the switch may use other types of gates besides an OR gate, and/or accept different numbers of control inputs.

Furthermore, control inputs may be activated or deactivated according to any suitable criteria—for example, they may reflect the transmission status of various frequency bands, other transmission activity, other activity of the transceiver (e.g., whether it is receiving instead of transmitting), and/or inputs received from other components of a surrounding electronic device.

As another example, the directionally-specific protection element may include a transistor having a first impedance for current flowing in the first direction and a second, higher impedance for current flowing in the second direction. In other words, the transistor may have a relatively low loss signal capability in the first direction (e.g., S21 in terms of transistor scattering parameters), while providing large reverse isolation in the second direction (e.g., S12 in terms of S-parameters). Thus, unlike the switch described above with respect to FIGS. 3A and 3B, a transistor may passively function as a directionally-specific protection element without regard to the current state of the transceiver.

Figure 4:
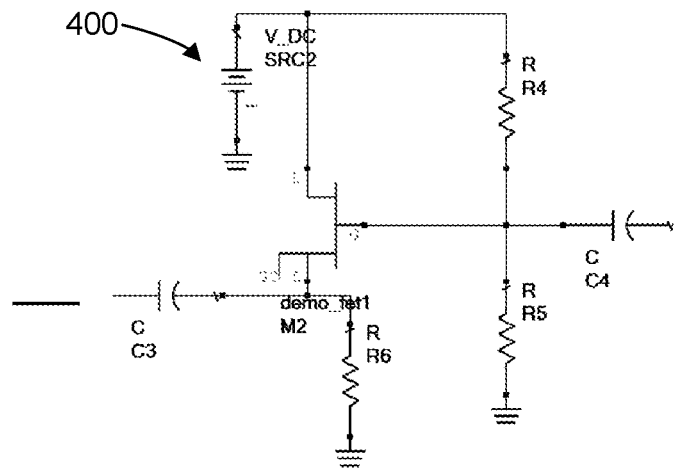
FIG. 4 schematically depicts another example directionally-specific protection element.

FIG. 4 schematically depicts one example transistor configuration 400 that may be useable to provide this functionality, and may be integrated into directionally-specific protection element 216. However, due to the degree of flexibility possible in transistor design, it will be understood that the arrangement shown in FIG. 4 is a non-limiting example. In other implementations, other suitable transistor designs that provide a higher impedance in one direction than in the other may be used.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 5:
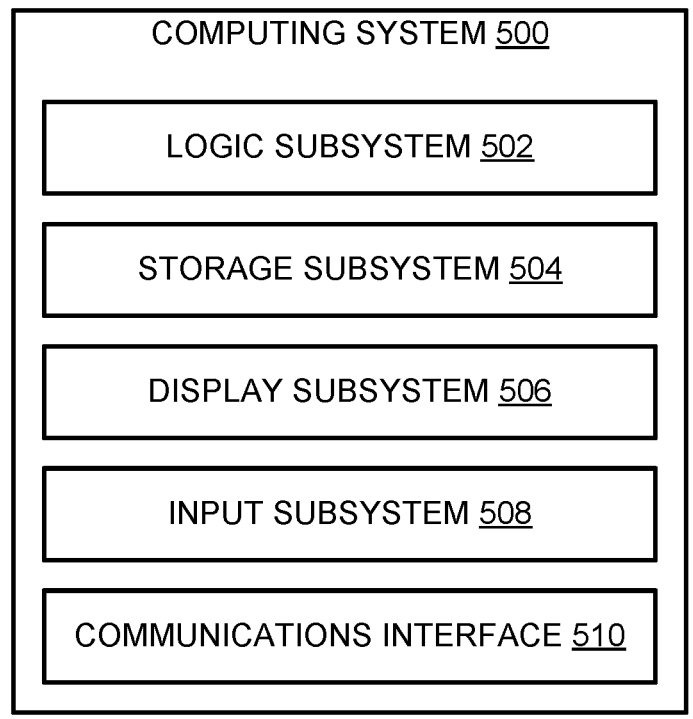
FIG. 5 schematically shows an example computing system.

FIG. 5 schematically shows a simplified representation of a computing system 500 configured to provide any to all of the compute functionality described herein. In particular, an "electronic device" as described above, including a transceiver assembly, may be implemented as computing system 500. Computing system 500 may take the form of one or more personal computers, network-accessible server computers, tablet computers, home-entertainment computers, gaming devices, mobile computing devices, mobile communication devices (e.g., smart phone), virtual/augmented/ mixed reality computing devices, wearable computing devices, Internet of Things (IoT) devices, embedded computing devices, and/or other computing devices.

Computing system 500 includes a logic subsystem 502 and a storage subsystem 504. Computing system 500 may optionally include a display subsystem 506, input subsystem 508, communication subsystem 510, and/or other subsystems not shown in FIG. 5.

Logic subsystem 502 includes one or more physical devices configured to execute instructions—e.g., transceiver controller 202 may be implemented as logic subsystem 502. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 504 includes one or more physical devices configured to temporarily and/or permanently hold computer information such as data and instructions executable by the logic subsystem. When the storage subsystem includes two or more devices, the devices may be collocated and/or remotely located. Storage subsystem 504 may include volatile, nonvolatile, dynamic, static, read/write, read-only, random-access, sequential-access, location-addressable, file-addressable, and/or content-addressable devices. Storage subsystem 504 may include removable and/or built-in devices. When the logic subsystem executes instructions, the state of storage subsystem 504 may be transformed—e.g., to hold different data.

Aspects of logic subsystem 502 and storage subsystem 504 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 506 may be used to present a visual representation of data held by storage subsystem 504. This visual representation may take the form of a graphical user interface (GUI). Display subsystem 506 may include one or more display devices utilizing virtually any type of technology. In some implementations, display subsystem may include one or more virtual-, augmented-, or mixed reality displays.

When included, input subsystem 508 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 510 may be configured to communicatively couple computing system 500 with one or more other computing devices. In some examples, the transceiver assemblies described above may be implemented as, or in conjunction with, communication subsystem 510. Communication subsystem 510 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a transceiver assembly includes: a radio frequency (RF) transceiver configured to transmit and receive RF signals; a transceiver controller operatively coupled with the transceiver via a transmit path and a receive path; a power amplifier disposed along the transmit path between the transceiver controller and the transceiver, the power amplifier configured to amplify RF signals received from the transceiver controller for transmission by the transceiver; a power detection line configured to provide power control feedback to the transceiver controller indicating an amplitude of current flowing from the power amplifier to the transceiver; and a directionally-specific protection element disposed along the power detection line, the directionally-specific protection element configured to allow the power control feedback to flow to the transceiver controller over the power detection line in a first direction, while preventing at least some electrical noise originating from the transceiver controller from flowing through the power detection line in a second direction, thereby preventing the electrical noise from entering the receive path. In this example or any other example, the transceiver assembly further comprises a low-noise amplifier disposed along the receive path between the transceiver and the transceiver controller, the low-noise amplifier configured to amplify RF signals received from the transceiver for processing by the transceiver controller. In this example or any other example, the directionally-specific protection element includes a switch configured to close during transmission of RF signals by the transceiver, and configured to open during receiving of RF signals at the transceiver. In this example or any other example, the electrical noise originating from the transceiver controller is redirected to ground while the switch is open. In this example or any other example, the switch includes an OR gate configured to open or close depending on an active status of one or more inputs to the OR gate. In this example or any other example, the OR gate receives two or more inputs indicating a transmission status of two or more different frequency bands of RF signals by the transceiver, and the OR gate is configured to close if any of the two or more inputs are active. In this example or any other example, the two or more different frequency bands include a 2.4 Ghz frequency band and a 5 Ghz frequency band. In this example or any other example, the directionally-specific protection element includes a transistor having a first impedance for current flowing in the first direction and a second, higher impedance for current flowing in the second direction. In this example or any other example, the electrical noise is generated by a local oscillator included in the transceiver controller. In this example or any other example, the transceiver controller is configured to change an amplitude of an RF signal sent to the power amplifier for transmission by the transceiver based on the power control feedback.

In an example, an electronic communications device comprises: a housing; and a transceiver assembly configured to enable wireless communications with other electronic devices, the transceiver assembly comprising: a radio frequency (RF) transceiver configured to transmit and receive RF signals; a transceiver controller operatively coupled with the transceiver via a transmit path and a receive path; a power amplifier disposed along the transmit path between the transceiver controller and the transceiver, the power amplifier configured to amplify RF signals received from the transceiver controller for transmission by the transceiver; a power detection line configured to provide power control feedback to the transceiver controller indicating an amplitude of current flowing from the power amplifier to the transceiver; and a directionally-specific protection element disposed along the power detection line, the directionally-specific protection element configured to allow the power control feedback to flow to the transceiver controller over the power detection line in a first direction, while preventing at least some electrical noise originating from the transceiver controller from flowing through the power detection line in a second direction, thereby preventing the electrical noise from entering the receive path. In this example or any other example, the electronic communications device further comprises a low-noise amplifier disposed along the receive path between the transceiver and the transceiver controller, the low-noise amplifier configured to amplify RF signals received from the transceiver for processing by the transceiver controller. In this example or any other example, the directionally-specific protection element includes a switch configured to close during transmission of RF signals by the transceiver, and configured to open during receiving of RF signals at the transceiver. In this example or any other example, the electrical noise originating from the transceiver controller is redirected to ground while the switch is open. In this example or any other example, the switch includes an OR gate configured to open or close depending on an active status of one or more inputs to the OR gate. In this example or any other example, the OR gate receives two or more inputs indicating a transmission status of two or more different frequency bands of RF signals by the transceiver, and the OR gate is configured to close if any of the two or more inputs are active. In this example or any other example, the directionally-specific protection element includes a transistor having a first impedance for current flowing in the first direction and a second, higher impedance for current flowing in the second direction. In this example or any other example, the electrical noise is generated by a local oscillator included in the transceiver controller. In this example or any other example, the transceiver controller is configured to change an amplitude of an RF signal sent to the power amplifier for transmission by the transceiver based on the power control feedback.

In an example, a transceiver assembly includes: a radio frequency (RF) transceiver configured to transmit and receive RF signals; a transceiver controller operatively coupled with the transceiver via a transmit path and a receive path; a power amplifier disposed along the transmit path between the transceiver controller and the transceiver, the power amplifier configured to amplify RF signals received from the transceiver controller for transmission by the transceiver; a low-noise amplifier disposed along the receive path between the transceiver and the transceiver controller, the low-noise amplifier configured to amplify RF signals received from the transceiver for processing by the transceiver controller; a power detection line configured to provide power control feedback to the transceiver controller indicating an amplitude of current flowing from the power amplifier to the transceiver; and a directionally-specific protection element disposed along the power detection line, the directionally-specific protection element configured to allow the power control feedback to flow to the transceiver controller during transmission of RF signals by the transceiver, and configured to redirect electrical noise originating from the transceiver controller away from the receive path and toward ground during receiving of RF signals by the transceiver.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A transceiver assembly, including:
a radio frequency (RF) transceiver configured to transmit and receive RF signals;
a transceiver controller operatively coupled with the transceiver via a transmit path and a receive path;
a power amplifier disposed along the transmit path between the transceiver controller and the transceiver, the power amplifier configured to amplify RF signals received from the transceiver controller for transmission by the transceiver;
a power detection line configured to provide power control feedback to the transceiver controller indicating an amplitude of current flowing from the power amplifier to the transceiver; and
a directionally-specific protection element disposed along the power detection line, the directionally-specific protection element configured to allow the power control feedback to flow to the transceiver controller over the power detection line in a first direction, while preventing at least some electrical noise originating from the transceiver controller from flowing through the power detection line in a second direction, thereby preventing the electrical noise from entering the receive path.

2. The transceiver assembly of claim 1, further comprising a low-noise amplifier disposed along the receive path between the transceiver and the transceiver controller, the low-noise amplifier configured to amplify RF signals received from the transceiver for processing by the transceiver controller.

3. The transceiver assembly of claim 1, where the directionally-specific protection element includes a switch configured to close during transmission of RF signals by the transceiver, and configured to open during receiving of RF signals at the transceiver.

4. The transceiver assembly of claim 3, where the electrical noise originating from the transceiver controller is redirected to ground while the switch is open.

5. The transceiver assembly of claim 3, where the switch includes an OR gate configured to open or close depending on an active status of one or more inputs to the OR gate.

6. The transceiver assembly of claim 5, where the OR gate receives two or more inputs indicating a transmission status of two or more different frequency bands of RF signals by the transceiver, and the OR gate is configured to close if any of the two or more inputs are active.

7. The transceiver assembly of claim 6, where the two or more different frequency bands include a 2.4 Ghz frequency band and a 5 Ghz frequency band.

8. The transceiver assembly of claim 1, where the directionally-specific protection element includes a transistor having a first impedance for current flowing in the first direction and a second, higher impedance for current flowing in the second direction.

9. The transceiver assembly of claim 1, where the electrical noise is generated by a local oscillator included in the transceiver controller.

10. The transceiver assembly of claim 1, where the transceiver controller is configured to change an amplitude of an RF signal sent to the power amplifier for transmission by the transceiver based on the power control feedback.

11. An electronic communications device, comprising:
a housing; and
a transceiver assembly configured to enable wireless communications with other electronic devices, the transceiver assembly comprising:
a radio frequency (RF) transceiver configured to transmit and receive RF signals;
a transceiver controller operatively coupled with the transceiver via a transmit path and a receive path;
a power amplifier disposed along the transmit path between the transceiver controller and the transceiver, the power amplifier configured to amplify RF signals received from the transceiver controller for transmission by the transceiver;
a power detection line configured to provide power control feedback to the transceiver controller indicating an amplitude of current flowing from the power amplifier to the transceiver; and
a directionally-specific protection element disposed along the power detection line, the directionally-specific protection element configured to allow the power control feedback to flow to the transceiver controller over the power detection line in a first direction, while preventing at least some electrical noise originating from the transceiver controller from flowing through the power detection line in a second direction, thereby preventing the electrical noise from entering the receive path.

12. The electronic communications device of claim 11, further comprising a low-noise amplifier disposed along the receive path between the transceiver and the transceiver controller, the low-noise amplifier configured to amplify RF signals received from the transceiver for processing by the transceiver controller.

13. The electronic communications device of claim 11, where the directionally-specific protection element includes a switch configured to close during transmission of RF signals by the transceiver, and configured to open during receiving of RF signals at the transceiver.

14. The electronic communications device of claim 13, where the electrical noise originating from the transceiver controller is redirected to ground while the switch is open.

15. The electronic communications device of claim 13, where the switch includes an OR gate configured to open or close depending on an active status of one or more inputs to the OR gate.

16. The electronic communications device of claim 15, where the OR gate receives two or more inputs indicating a transmission status of two or more different frequency bands of RF signals by the transceiver, and the OR gate is configured to close if any of the two or more inputs are active.

17. The electronic communications device of claim 13, where the directionally-specific protection element includes a transistor having a first impedance for current flowing in the first direction and a second, higher impedance for current flowing in the second direction.

18. The electronic communications device of claim 13, where the electrical noise is generated by a local oscillator included in the transceiver controller.

19. The electronic communications device of claim 13, where the transceiver controller is configured to change an amplitude of an RF signal sent to the power amplifier for transmission by the transceiver based on the power control feedback.

20. A transceiver assembly, including:
a radio frequency (RF) transceiver configured to transmit and receive RF signals;
a transceiver controller operatively coupled with the transceiver via a transmit path and a receive path;
a power amplifier disposed along the transmit path between the transceiver controller and the transceiver, the power amplifier configured to amplify RF signals received from the transceiver controller for transmission by the transceiver;
a low-noise amplifier disposed along the receive path between the transceiver and the transceiver controller, the low-noise amplifier configured to amplify RF signals received from the transceiver for processing by the transceiver controller;
a power detection line configured to provide power control feedback to the transceiver controller indicating an amplitude of current flowing from the power amplifier to the transceiver; and
a directionally-specific protection element disposed along the power detection line, the directionally-specific protection element configured to allow the power control feedback to flow to the transceiver controller during transmission of RF signals by the transceiver, and configured to redirect electrical noise originating from the transceiver controller away from the receive path and toward ground during receiving of RF signals by the transceiver.

* * * * *